Figure 1:
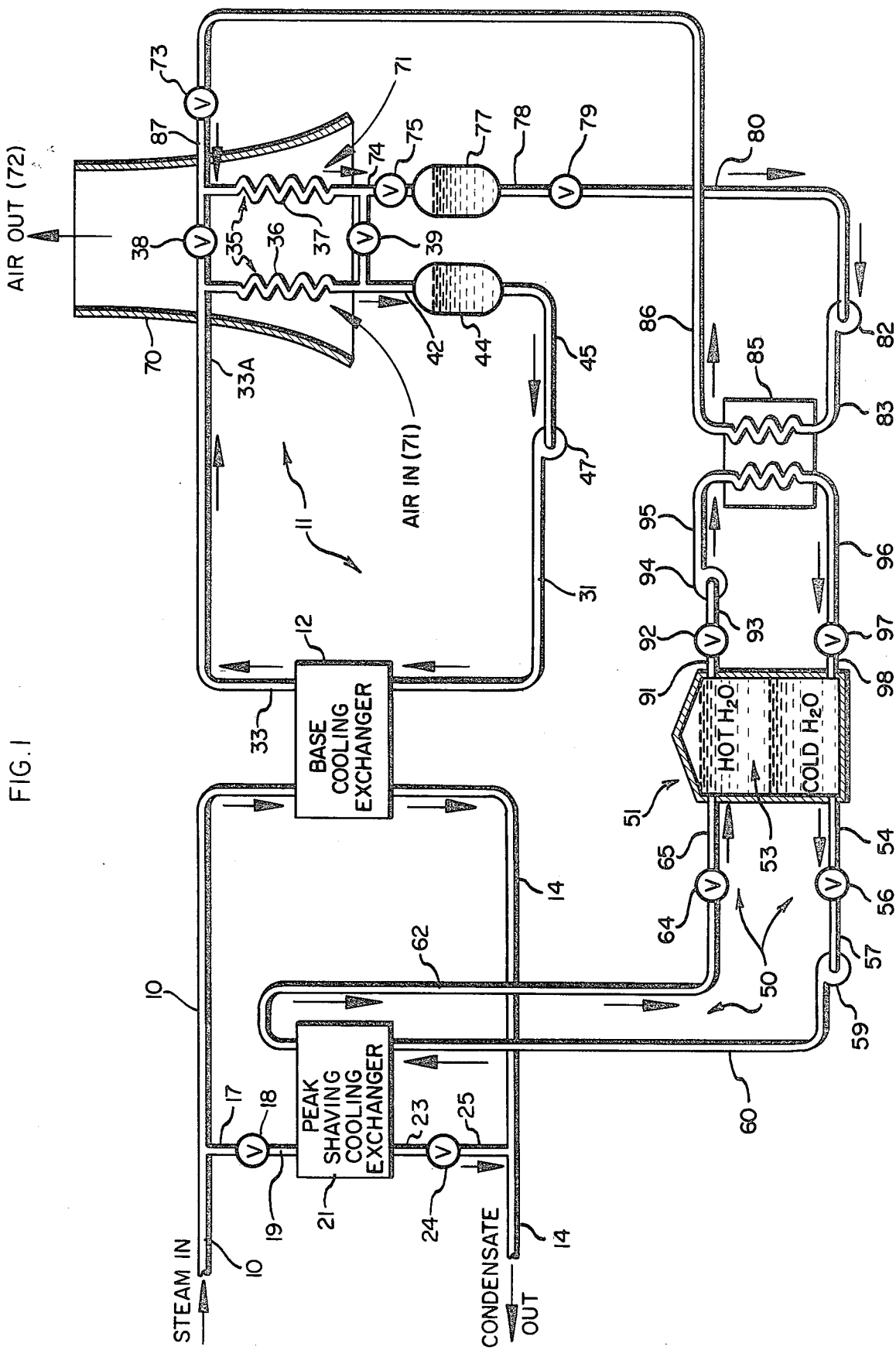

United States Patent [19]

Schmitt et al.

[11] 4,315,404
[45] Feb. 16, 1982

[54] COOLING SYSTEM, FOR POWER GENERATING PLANT, USING SPLIT OR PARTITIONED HEAT EXCHANGER

[75] Inventors: Richard L. Schmitt, Batavia; Ban-Yen Lai, Willowbrook; Matloob Husain, Wheaton, all of Ill.

[73] Assignee: Chicago Bridge & Iron Company, Oak Brook, Ill.

[21] Appl. No.: 94,480

[22] Filed: Nov. 15, 1979

Related U.S. Application Data

[63] Continuation-in-part of Ser. No. 42,364, May 29, 1979, Pat. No. 4,270,358.

[51] Int. Cl.³ .............................................. F28B 5/00
[52] U.S. Cl. ..................................... 60/690; 60/692; 62/332; 165/104.31; 165/DIG. 1; 165/104.14
[58] Field of Search ............ 165/DIG. 1, 105, 104 S, 165/104.31, 104.14; 60/690, 691, 692; 62/332

[56] References Cited

U.S. PATENT DOCUMENTS

| | | | |
|---|---|---|---|
| 3,358,748 | 12/1967 | Christopher | 165/DIG. 1 |
| 3,635,042 | 1/1972 | Spangemacher | 165/DIG. 1 X |
| 3,820,334 | 6/1974 | Heller et al. | 165/DIG. 1 X |
| 3,831,667 | 8/1974 | Kilgore et al. | 165/DIG. 1 |
| 3,841,100 | 10/1974 | Fortescue et al. | 165/DIG. 1 |
| 3,881,548 | 5/1975 | Budenholzer | 60/693 X |
| 3,935,902 | 2/1976 | Heller et al. | 165/DIG. 1 |
| 4,139,056 | 2/1979 | Scholl | 165/45 X |
| 4,144,723 | 3/1979 | Morse et al. | 62/332 |

FOREIGN PATENT DOCUMENTS

| | | | |
|---|---|---|---|
| 2412048 | 7/1979 | France | 165/DIG. 1 |
| 2416440 | 8/1979 | France | 165/DIG. 1 |

OTHER PUBLICATIONS

Rossie, J. P. et al., *Dry-Type Cooling Towers Part I*, Water Quality Office, EPA, Project 16130EES, Contract 14-12-823, 11/1970, pp. 113-116.

*Primary Examiner*—Albert W. Davis
*Attorney, Agent, or Firm*—Merriam, Marshall & Bicknell

[57] ABSTRACT

Apparatus and method comprising a base cooling system using a refrigeration cycle, a peak-shaving system using a secondary cooling liquid, and a regeneration system for the peak-shaving system secondary cooling liquid. A split or partitioned heat exchanger alternately condenses only the refrigerant in the base cooling system or it condenses that refrigerant and a refrigerant used to cool hot secondary cooling liquid.

The apparatus can be used in power generating plants with the split heat exchanger located in a cooling tower.

19 Claims, 2 Drawing Figures

COOLING SYSTEM, FOR POWER GENERATING PLANT, USING SPLIT OR PARTITIONED HEAT EXCHANGER

This application is a continuation-in-part of our copending application Ser. No. 42,364, filed May 29, 1979, now U.S. Pat. No. 4,270,358, granted June 2, 1981.

This invention relates to apparatus and methods of cooling and/or condensing a hot fluid stream. More particularly, this invention pertains to apparatus and methods of cooling and/or condensing a hot fluid stream using a supplementary or peak shaving cooling system which supplies necessary additional cooling when a base cooling system maximum capacity or duty is exceeded, such as on hot days.

Many commercial and industrial processes generate large amounts of waste heat which must be removed for successful operation. The waste heat is often carried in the form of a hot fluid stream. For a number of reasons, it is often undesirable or impermissible for the hot fluid stream to be disposed of, so it must be cooled and reused. One such hot fluid stream is spent steam, such as from an electric power generating steam turbine, which is condensed to water which then is reconverted to steam in a boiler to be used again in powering the turbine.

Regardless of the source of the hot fluid stream, a base cooling system of one type or another is provided for cooling the hot fluid stream. All such systems rely, ultimately, on heat rejection to the environment, either by direct rejection, or indirectly through an intermediate fluid, to air or to water from a river, lake or sea.

A typical cooling system can be illustrated further by reference to a power generating plant. In the production of electric power, heat is first produced by nuclear energy or combustion of a fossil fuel such as oil, gas or coal. The heat produced is then used to convert water into steam. The steam is conducted at high pressure to a turbine which it drives. The turbine is, of course, coupled to a generator which produces electric power. The spent steam from the turbine is condensed by the cooling system and then the water is recycled and reheated to steam again.

An air-cooled system is generally designed and built to provide a cooling capacity or duty adequate for the intended purpose on the hottest day, or ambient temperature, anticipated at the site of the plant involved. This results in an excess cooling capacity for all but a small number of days out of a year. Even on the hottest days, the maximum cooling capacity of the system often is not utilized except during the very warmest part of the day. This is because the atmospheric temperature from day to night will vary as much as, or more than, 20° to 30° F., making it unnecessary to utilize the maximum cooling capacity of the system most of each day. The cooling system installation, operation and maintenance involve large costs and expenses which cover a system that is not anywhere fully employed, regardless of the hot fluid stream to be cooled.

A water cooled system is generally designed for the highest temperature of the water from the available source e.g. river, lake or sea. The cooling water picks up heat in condensing the steam. The heated cooling water is disposed of into the river, lake or sea but this is undesirable in certain areas because it causes the temperature of natural bodies of water to rise excessively, leading to ecological imbalance.

As an alternative, many power generating plants cool the heated cooling water in an evaporative cooling tower by contacting it with ambient air. Large natural or mechanical draft cooling towers are extensively used for this purpose. While the heated water is cooled in this manner, a substantial amount is expelled as water vapor which may form artificial clouds leading to fog, ice and other problems, in addition to the loss of increasingly scarce fresh water.

An evaporative cooling tower serving a 1000 megawatt electric generating plant may lose as much as 600,000 gallons of water per hour into the atmosphere. Also, the evaporative towers are susceptible to a large growth of bacteria, causing additional environmental problems.

Various dry-type cooling systems have also been proposed. In one such system, ammonia is used in a closed loop cycle to absorb heat in the steam condenser of a power generating plant and then reject heat in a cooling tower where air absorbs the heat from the ammonia coolant. This process is not very efficient in comparison to an evaporative or once-through water cooling system. One of the shortcomings of the system is that the temperature of the ammonia refrigerant entering the cooling tower is close to the temperature of the condensing steam, which in power plants ranges between 100° and 135° F. When the weather is hot and the ambient air flowing through the tower, for example, is about 95° F. or above, the temperature differential between the ammonia coolant and the ambient air is smaller than desired for efficient heat exchange. Also, the cooling tower cannot be designed for natural draft, because of low differential temperatures between ambient air and the coolant temperature. To promote more efficient heat exchange in the cooling tower, the steam condensing temperatures may be increased but this leads to a higher turbine back pressure and lower turbine efficiency with a corresponding drop in power output. When the air temperature is lower than 90° F., better cooling is effected but the high costs of providing for peak ambient temperatures make the system uneconomical.

In Matloob Husain et al, U.S. patent application Ser. No. 42,364 filed May 29, 1979, now U.S. Pat. No. 4,270,358, there is disclosed a method of cooling a hot fluid stream by contacting the hot fluid stream in indirect heat exchange with a base cooling fluid so long as the base cooling fluid accepts heat rejected from the hot fluid stream and adequately cools the same. The cooling capacity of the base cooling fluid is supplemented, when it provides inadequate cooling, by contemporaneously also indirectly contacting the hot fluid stream with a secondary cooling liquid, which is cold, thereby heating the secondary cooling liquid. The so-heated secondary cooling liquid is delivered to a hot reservoir for storage. The hot secondary cooling liquid is removed from the hot reservoir, cooled and delivered to a cold reservoir for storage. Cold secondary cooling liquid is withdrawn from the cold reservoir and again delivered into indirect heat exchange with the hot fluid stream when the base cooling fluid provides inadequate cooling for the hot fluid stream.

Regardless of the source of the hot fluid stream, the base cooling fluid is desirably cooled in a cooling tower by indirect heat rejection to air. In a particular method, the temperature of the air, the size of the cooling tower and the rate of air flow through the cooling tower provide a limit as to the cooling of the hot fluid stream which can be effected by the base cooling fluid, which can be a refrigerant such as ammonia, on hot days so that when such cooling is inadequate, supplemental cooling by means of the secondary cooling liquid, which can be water, is activated. Furthermore, the hot secondary cooling liquid can be removed from the hot reservoir and be indirectly cooled at least partially by air. In a similar manner, the hot secondary cooling liquid can be removed from the hot reservoir and be indirectly cooled at least partially by the base cooling fluid following cooling in the cooling tower.

The described system of Matloob Husain et al, while highly useful, uses in the cooling tower a heat exchanger which condenses only a single stream of base cooling fluid. As a result, the efficiency of the cooling tower is limited in that the temperature difference between the ambient air and the base cooling fluid fed to the cooling tower heat exchanger, is not as wide as desired to induce good natural draft on warm days.

According to the present invention, it has been found advantageous to employ a heat exchanger with split or divisible duty in the cooling tower. The entire heat exchanger can be used for steam condensing duty on those days, or parts of days, when the atmospheric temperature is sufficiently below the temperature of the base cooling fluid cooled in the cooling tower to provide acceptable heat rejection to the air, desirably with good natural draft through the tower. On cool days, or a cool portion of a day, the heat exchanger can be split or partitioned and a part or section of it used to cool hot base cooling fluid from steam condensing duty, while the other part or section of the heat exchanger can be inactivated or used to cool base cooling fluid heated by cooling hot secondary cooling liquid, such as a hot peak-shaving liquid, like water.

The use of a heat exchanger with a split duty in the cooling tower makes it possible to always circulate a fluid stream through at least part of the heat exchanger to have a temperature differential between it and the prevailing atmospheric or ambient air temperature to induce natural draft in the cooling tower.

A complete cooling system provided by the invention incorporating a split duty heat exchanger in a cooling tower broadly comprises apparatus having a refrigeration loop in which heat can be absorbed by a refrigerant base cooling fluid therein in condensing from all to part of a hot fluid stream and heat can be rejected from the refrigerant to air in a cooling tower operatively communicating with the refrigeration loop, a peak-shaving cooling loop having a cold secondary cooling liquid which absorbs heat by condensing some of the hot fluid stream and is thereby converted to hot secondary cooling liquid, and a by-pass loop operatively communicating with the refrigeration loop having means to circulate some of the refrigerant base cooling fluid into heat absorption with the hot secondary cooling liquid to cool it to cold secondary cooling liquid, and having means to reject heat from the refrigerant in the by-pass loop to air in the cooling tower, while the refrigeration loop itself is at least partially operating.

More specifically, the invention provides apparatus comprising a first closed loop containing a refrigerant base cooling fluid; a first heat exchanger in the first closed loop sized to adequately cool and/or condense a hot fluid stream passed into contact therewith by rejection of heat to the refrigerant base cooling fluid up to a maximum temperature of the refrigerant base cooling fluid; means to pass the hot fluid stream through the first heat exchanger in indirect heat exchange with the refrigerant base cooling fluid, a second heat exchanger for cooling the hot fluid stream when heat rejection therefrom to the refrigerant base cooling fluid alone provides inadequate cooling of the hot fluid stream; means to pass the hot fluid stream through the second heat exchanger; a hot reservoir for a secondary cooling liquid when hot; a cold reservoir for the secondary cooling liquid when cold; a conduit from the cold reservoir to the second heat exchanger for supplying cold secondary cooling liquid in indirect heat exchange to the hot fluid stream passed through the second heat exchanger; a conduit for withdrawing hot secondary cooling liquid from the second heat exchanger and delivering it to the hot reservoir; a conduit communicating with the hot reservoir and a cooler for delivering hot secondary cooling liquid from the hot reservoir to the cooler to be cooled; a conduit communicating with the cooler and the cold reservoir for delivering cold secondary cooling liquid from the cooler to the cold reservoir; a cooling tower containing first and second heat exchanger sections; the first closed loop containing base refrigerant cooling fluid having the first and second sections of the cooling tower heat exchanger positioned therein in parallel arrangement; means to selectively circulate refrigerant cooling fluid through only the cooling tower heat exchanger first section, when the ambient or atmospheric air flowing through the cooling tower is below a predetermined temperature, before the refrigerant base cooling fluid is circulated through the first heat exchanger; a secondary closed loop containing refrigerant base cooling fluid in controllable communication with the first closed loop, the cooling tower heat exchanger second section and the cooler; means to circulate refrigerant base cooling fluid in the secondary closed loop for cooling hot secondary cooling liquid in the cooler by indirect heat exchange with cold refrigerant base cooling fluid passed therethrough, when the ambient or atmospheric air flowing through the cooling tower is below a predetermined temperature; and means for terminating circulation or refrigerant base cooling fluid through the secondary closed loop, and means for the circulation of refrigerant base cooling fluid in the first closed loop simultaneously through the first and second sections of the cooling tower heat exchanger, when the ambient or atmospheric air temperature flowing through the cooling tower is above a predetermined temperature.

According to a further aspect of the invention, there is provided a method of cooling a hot fluid stream which comprises contacting a hot fluid stream in indirect heat exchange with a base cooling fluid so long as the base cooling fluid accepts heat rejected from the hot fluid stream and adequately cools the same; cooling the hot base cooling fluid by passing it through parallel first and second sections of a cooling tower heat exchanger and then returning it to again accept heat rejected by the hot fluid stream; supplementing the cooling of the hot fluid stream when the base cooling fluid provides inadequate cooling thereof, after being passed through both of said first and second sections of the cooling tower heat exchanger, by contemporaneously also indirectly contacting the hot fluid stream with a secondary cooling liquid which is cold thereby heating the secondary cooling liquid; delivering the hot secondary cooling liquid to a hot reservoir for storage; isolating the flow and subsequent recirculation of base cooling fluid through the cooling tower heat exchanger first section from flow and subsequent recirculation of base cooling fluid through the cooling tower heat exchanger second section, when the hot fluid stream is sufficiently cooled by base cooling fluid itself cooled by passage through only the first section; using the stream of base cooling fluid cooled by passing it through the second section of the cooling tower to cool hot secondary cooling liquid removed from the hot reservoir; delivering the cold secondary cooling liquid to a cold reservoir for storage; and withdrawing cold secondary cooling liquid from the cold reservoir and again delivering it into indirect heat exchange with the hot fluid stream when the base cooling fluid provides inadequate cooling.

Although the described method can be suitably employed with a hot fluid stream from nearly any source, it is especially useful when the hot fluid stream is waste steam from a steam driven turbine.

Even though the method can be practiced in a way in which the base cooling fluid is discarded, the method is highly useful when the base cooling fluid is heated by absorption of heat from the hot fluid stream, the hot cooling fluid is cooled by passing it through a cooling tower and then is returned to again accept heat rejected by the hot fluid stream.

In a particularly useful method, the base cooling fluid can be a refrigerant, in a closed loop refrigeration cycle. The base cooling fluid or refrigerant can be converted from a liquid to a vapor by heat rejected to it from the hot fluid stream, and the vapor condensed to a liquid in passing through the cooling tower.

For a highly efficient operation in an electric generating power plant the hot secondary cooling liquid can be cooled primarily during evening hours when demand for power is reduced and then cold secondary cooling liquid used during daylight hours to cool the hot fluid stream when the demand for power and cooling of the hot fluid stream is highest. In such an operation, the hot fluid stream could be waste steam from a steam driven turbine used to generate electric power, with the steam condensed to water in a surface condenser.

The apparatus of the invention is considered especially useful when the secondary cooling liquid is water. In this regard, when water is used, or any other liquid, the cold reservoir and the hot reservoir are desirably enclosed. Thus, the cold reservoir and the hot reservoir can be separate tanks, or the two reservoirs can be stratified in the same tank and be separated by difference in gravity, or they can be physically separated by a barrier membrane.

The cooler, in which the hot secondary cooling liquid is cooled, can reject heat to cold base cooling fluid.

Figure 2:
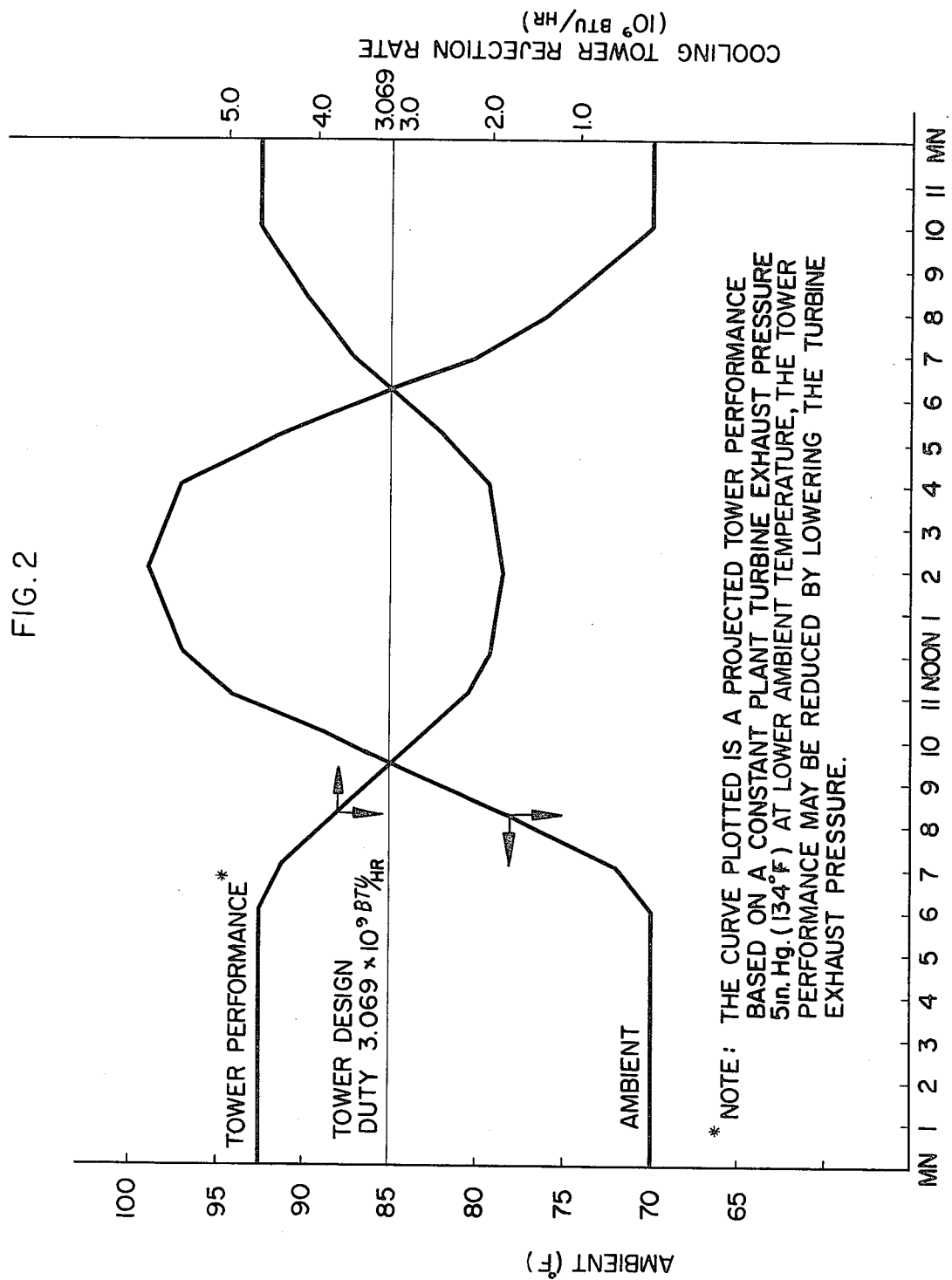

The invention will be described further in conjunction with the attached drawings in which:

FIG. 1 is a diagrammatic drawing illustrating broadly a combination of apparatus provided by the invention for cooling a hot fluid stream; and FIG. 2 is a graph correlating the cooling capacity of a specific apparatus according to FIG. 1 with the ambient, or atmospheric air, temperature and the hour of the day.

With reference to FIG. 1, a hot fluid process stream is fed by conduit 10 through a base cooling system 11 containing a heat exchanger 12. The base cooling system is designed and sized to provide less than all the cooling duty required to cool the hot fluid process stream during an entire year, such as when the temperature during summer days goes above a predetermined temperature. The cooled process fluid, such as water when steam is condensed, is removed by conduit 14 from the base cooling system and then delivered to an appropriate destination, such as for reuse.

Base cooling system 11 includes the heat exchanger 12 as an integral part of a closed loop refrigeration cycle, using a refrigerant, such as ammonia. Ammonia, which has been cooled and pressurized to a liquid, is supplied by conduit 31 to heat exchanger 12. The heat rejected by the condensing process stream vaporizes the ammonia. The ammonia vapor is removed from heat exchanger 12 by conduit 33 and passed through part 36, or through both parts or sections 36 and 37, of heat exchanger 35 located in cooling tower 70.

Cooling tower 70 can be a natural draft, forced or induced draft, air cooled type of cooling tower. Air 71, at ambient or atmospheric temperature, enters the bottom of the cooling tower 70, and the heated air 52 flows out the top of the tower.

Normally valves 38 and 39 are open and valves 73 and 75 are closed so that the entire amount of hot base cooling refrigerant is fed by conduit 33 through both parts or sections 36 and 37 of heat exchanger 35 to conduit 42 which delivers the condensed liquid refrigerant to vessel 44.

The described refrigeration cycle is sized to provide a cooling capacity which is inadequate to remove all of the heat rejected by the process stream, such as steam fed to a steam condenser, during those days in the summer when the air temperature goes above a design temperature, such as 99° F. When the air temperature goes above such a temperature, the extra cooling capacity is provided by supplementary or peak-shaving cooling system 50 which includes a heat exchanger 21, a secondary cooling liquid storage tank 51, and conduits and valves to effect secondary cooling liquid routing and control. When the air temperature goes above a design temperature, such as 99° F., and the base cooling system, using both parts or sections 36 and 37 of heat exchanger 35 in the refrigeration loop and sending all refrigerant to conduit 42, is inadequate in itself to cool the entire hot fluid process stream, such as steam, part of the hot fluid process stream is then diverted from conduit 10 to conduit 17, through open valve 18 to conduit 19 and then through peak-shaving cooling heat exchanger 21. This cooled part of the process stream, which is condensed water if steam is the hot process stream, is removed from heat exchanger 21 by conduit 23, fed through open valve 24 to conduit 25 and by it to conduit 14. Valves 18 and 24 will be closed when the peak-shaving cooling system 50 is not in use.

The peak-shaving cooling system 50 has a secondary liquid 53 stored in tank 51. When the peak-shaving cooling system is in use, cold secondary cooling liquid 53 is withdrawn from the bottom of tank 51 by conduit 54 and fed through open valve 56 to conduit 57, which delivers it to pump 59. Pump 59 delivers the cold secondary cooling liquid to conduit 60 which feeds it through heat exchanger 21. Heat rejected by the hot process stream heats the secondary cooling fluid in heat exchanger 21. The hot secondary cooling fluid is withdrawn from heat exchanger 21 by conduit 62, fed through open valve 64 to conduit 65 and delivered to the top portion of tank 51 where it forms a stratified hot reservoir volume on top of the cold reservoir volume of secondary cooling fluid in the lower portion of the tank 51. Even though the hot and cold secondary cooling fluid volumes fluctuate during operation of the system, the volumes remain separate or stratified because of the different densities of the hot and cold cooling fluid, particularly when it is water. No cooling liquid is consumed or discarded in the described system and all heat is rejected to air instead of to a lake or stream. It is essential, of course, for optimum operation of the described peak-shaving system to have a sufficient volume of cold secondary cooling liquid in tank 51 to supply the necessary cooling, at least on a day-by-day basis. It is contemplated that tank 51 will store a sufficient volume of secondary cooling liquid to adequately supplement the base cooling system during the daily hours of maximum temperature, such as from about 11 A.M. to 4 P.M., during the hottest summer days of the year.

It will be readily appreciated that the volume of liquid used in the supplemental or peak-shaving system 50, and the amount of heat rejected to it by the hot fluid process stream, must be adequate to provide complementary cooling which when combined with the cooling supplied by the base cooling system will meet the total cooling duty required by the hot fluid process stream. The rate of secondary cooling liquid circulation is controlled to match the difference between the process stream duty and the capacity of the base cooling system.

The hot secondary cooling liquid is retained in tank 51 until such time as it is advantageous to cool it. Generally, the most expeditious period in the summer for cooling the hot secondary cooling liquid is at night-time when the temperature of the air usually is at a minimum. Fortuitously, at the same time the cooling duty on the base cooling refrigeration loop system is at its lowest, the cooling capacity of the refrigeration loop is at its daily maximum because of the increased cooling achieved in the cooling tower by cooler air flowing through it. This makes it unnecessary to use all of heat exchanger 35 in cooling tower 70 to cool base cooling refrigerant in the refrigeration loop 11 and pass it through heat exchanger 12. The extra capacity of heat exchanger 35 accordingly becomes available for other cooling purposes. According to the invention, that extra cooling capacity of heat exchanger 35 is used to cool hot secondary cooling liquid from peak-shaving cooling system 50 when the peak-shaving cooling system is not required during any day or period of days.

When part 37 of heat exchanger 35 is not needed in base cooling refrigeration loop 11, it is isolated from that system by shutting valves 38 and 39 and opening valves 73 and 75. The refrigerant condensed in heat exchanger part 37 then flows through conduit 74, open valve 75 and to vessel 77. The cold liquid refrigerant, such as ammonia, is conveyed from vessel 77 by conduit 78, through open valve 79, to conduit 80 which delivers it to liquid pump 82. Conduit 83 delivers the refrigerant from pump 82 to heat exchanger 85 where it is warmed and vaporizes by heat exchange with hot secondary cooling liquid, such as water. The hot refrigerant vapor flows from heat exchanger 85 to conduit 86 which directs it through open valve 73, through it to conduit 87 and then to heat exchanger section 37. The refrigerant is cooled and condensed in section 37.

Hot secondary cooling fluid, such as water, in tank 51 from peak-shaving cooling, is withdrawn from the tank by conduit 91, fed through open valve 92 to conduit 93 and then to pump 94. The liquid is delivered by conduit 95 from pump 94 to heat exchanger 85 where it is cooled by heat exchange with cold refrigerant. The cold secondary cooling liquid is removed from heat exchanger 85 by conduit 96 which feeds it through open valve 97 to conduit 98 into tank 51. The cooling is continued in this manner until the entire amount of hot secondary cooling liquid has been cooled or until it becomes necessary to reincorporate part 37 of heat exchanger 37 into the base cooling refrigeration system 11. Valves 92 and 97 are closed at that time. Similarly, valves 73 and 75 are closed when cooling of the secondary cooling liquid is not required or is unnecessary.

The described cooling apparatus enables sizing the base cooling system for an average air temperature considerably lower than the maximum air temperature, thus reducing the capital cost and power consumption involved when a base cooling system is sized for maximum air temperature to be experienced thereby providing much more cooling capacity for most of the year than is needed. The peak-shaving system of this invention is predicated on the fact that maximum air temperatures are experienced only for a few hours on any given day, and that most day to night temperature swings are 25° to 30° F. thus permitting cooling of the hot secondary cooling liquid at night using electrical power not needed because of reduced nighttime demand compared to daylight power consumption.

By utilizing a cool tower heat exchanger 35 separable into two or more parts or sections, enhanced cooling ability with beneficial flexibility, is achieved without increased capital cost. The entire heat exchanger can be used during daylight for fluid process stream cooling, such as steam condensing in a power generating plant, while at night the heat exchanger can be divided and part used to cool the fluid process stream and part used to cool the peak-shaving secondary cooling liquid, such as water. In both cases, the same refrigerant working fluid can be used.

The cooling system described in conjunction with FIG. 1 can be used to cool a hot fluid process stream from one of many sources, such as a power plant, refinery, petrochemical plant, steel plant and copper smelter. It is particularly adaptable for dry cooling and condensing steam in an electric power generating plant.

FIG. 2 illustrates graphically the daily cooling requirements on an hourly basis for a 650 MW electric power generating plant. The base cooling system and the peak-shaving cooling system illustrated by FIG. 1 provide the basis for the curves constituting the graph. The refrigerant is ammonia and water is the cooling liquid for peak-shaving cooling. The data in the following Tables 1 to 3 illustrate operating conditions when the atmospheric air is at 70° F., 85° F. and 99° F. At 70° F., the system stores refrigeration in the form of cold secondary cooling water and operating of the peak-shaving section is not required. At 85° F., operation of the peak-shaving section is still not required but refrigeration is not being stored in the secondary cooling water. When the air is at 99° F., the cold secondary cooling water is used to supplement the base cooling system of the ammonia refrigeration cycle.

TABLE 1

System Operating at Ambient 70° F.

| | Drawing No. | | | | | | | | | | | | | | | |
|---|---|---|---|---|---|---|---|---|---|---|---|---|---|---|---|---|
| | 10 | 14 | 31 | 33 | 33A | 36 | 71 | 72 | 83 | 86 | 87 | 74 | 60 | 62 | 91 | 98 |
| Pressure PSIA | 3.93"Hg | 3.93"Hg | 297 | 292 | 292 | 287 | 14.6 | 14.586 | 206 | 201 | 201 | 196 | — | — | 60 | 50 |
| Temp. °F. | 125 | 125 | 122 | 121 | 121 | 120 | 70 | 114 | 95 | 95 | 95 | 95 | — | — | 130 | 100 |
| Flow LB/HR | $2.974 \times 10^6$ | $2.974 \times 10^6$ | $6.674 \times 10^6$ | $6.674 \times 10^6$ | $6.674 \times 10^6$ | $6.674 \times 10^6$ | $3.54 \times 10^8$ | $3.54 \times 10^8$ | $1.479 \times 10^6$ | $1.479 \times 10^6$ | $1.479 \times 10^6$ | $1.479 \times 10^6$ | — | — | $2.368 \times 10^7$ | $2.368 \times 10^7$ |
| Remarks | $3.030 \times 10^6$ BTU/HR rejected from steam | | $3.030 \times 10^9$ BTU/HR rejected to ammonia loop | | | | $3.74 \times 10^9$ BTU/HR rejected to air | | $7.1 \times 10^8$ BTU/HR for 10 hours to chill the peak-shaving water | | This section of heat exchanger is used to condense ammonia used to chill peak-shaving water | | | | 675,900 barrel capacity tank | |

TABLE 2

System Operating at Ambient 85° F.

| | Drawing No. | | | | | | | | | | | | | | | |
|---|---|---|---|---|---|---|---|---|---|---|---|---|---|---|---|---|
| | 10 | 14 | 31 | 33 | 33A | 36 | 71 | 72 | 83 | 86 | 87 | 74 | 60 | 62 | 91 | 98 |
| Pressure PSIA | 5"Hg | 5"Hg | 334 | 329 | 329 | 324 | 14.6 | 14.589 | — | — | 329 | 324 | — | — | — | — |
| Temp. °F. | 134 | 134 | 130 | 130 | 130 | 129 | 85 | 125 | — | — | 130 | 129 | — | — | — | — |
| Flow LB/HR | $3.012 \times 10^6$ | $3.012 \times 10^6$ | $6.92 \times 10^6$ | $6.92 \times 10^6$ | $5.38 \times 10^6$ | $5.38 \times 10^6$ | $3.216 \times 10^8$ | $3.216 \times 10^8$ | — | — | $1.54 \times 10^6$ | $1.54 \times 10^6$ | — | — | — | — |
| Remarks | $3.069 \times 10^9$ BTU/HR rejected from steam | | $3.069 \times 10^9$ BTU/HR rejected to ammonia loop | | | | $3.069 \times 10^9$ BTU/HR rejected to air | | | | This section of heat exchanger is used in main ammonia loop | | No need to use peak-shaving | | | |

TABLE 3

System Operating at Ambient 99° F.

| | Drawing No. | | | | | | | | | | | | | | | |
|---|---|---|---|---|---|---|---|---|---|---|---|---|---|---|---|---|
| | 10 | 14 | 31 | 33 | 33A | 36 | 71 | 72 | 83 | 86 | 87 | 74 | 60 | 62 | 91 | 98 |
| Pressure PSIA | 5"Hg | 5"Hg | 340 | 335 | 335 | 330 | 14.6 | 14.592 | — | — | 335 | 330 | 60 | 50 | — | — |
| Temp. °F. | 134 | 134 | 132 | 131 | 131 | 130 | 99 | 128 | — | — | 131 | 130 | 100 | 130 | — | — |
| Flow LB/HR | $3.012 \times 10^6$ | $3.012 \times 10^6$ | $4.158 \times 10^6$ | $4.158 \times 10^6$ | $3.234 \times 10^6$ | $3.234 \times 10^6$ | $2.641 \times 10^8$ | $2.641 \times 10^8$ | — | — | $0.924 \times 10^6$ | $0.924 \times 10^6$ | $4.103 \times 10^7$ | $4.103 \times 10^7$ | — | — |
| Remarks | $3.069 \times 10^9$ BTU/HR rejected from steam | | $1.838 \times 10^9$ BTU/HR rejected to ammonia loop | | | | $1.838 \times 10^9$ BTU/HR rejected to air | | | | This section of heat exchanger is used in main ammonia loop | | $1.231 \times 10^9$ BTU/HR transferred to water | | | |

The foregoing detailed description has been given for clearness of understanding only, and no unnecessary limitations should be understood therefrom as modifications will be obvious to those skilled in the art.

What is claimed is:

1. Apparatus comprising:
   a refrigeration loop in which heat can be absorbed by a refrigerant base cooling fluid therein in condensing from all to part of a hot fluid stream and heat can be rejected from the refrigerant to air in a cooling tower operatively communicating with the refrigeration loop,
   a peak-shaving cooling loop having a cold secondary cooling liquid which absorbs heat by condensing some of the hot fluid stream and is thereby converted to hot secondary cooling liquid, and
   a by-pass loop operatively communicating with the refrigeration loop having means to circulate some of the refrigerant base cooling fluid into heat absorption with the hot secondary cooling liquid to cool it to cold secondary cooling liquid, and having means to reject heat from the refrigerant in the by-pass loop to air in the cooling tower, while the refrigeration loop itself is at least partially operating.

2. Apparatus comprising:
   a first closed loop containing a refrigerant base cooling fluid,
   a first heat exchanger in the first closed loop sized to adequately cool and/or condense a hot fluid stream passed into contact therewith by rejection of heat to the refrigerant base cooling fluid up to a maximum temperature of the refrigerant base cooling fluid,
   means to pass the hot fluid stream through the first heat exchanger in indirect heat exchange with the refrigerant base cooling fluid, a second heat exchanger for cooling the hot fluid stream when heat rejection therefrom to the refrigerant base cooling fluid alone provides inadequate cooling of the hot fluid stream, means to pass the hot fluid stream through the second heat exchanger, a hot reservoir for a secondary cooling liquid when hot, a cold reservoir for the secondary cooling liquid when cold, a conduit from the cold reservoir to the second heat exchanger for supplying cold secondary cooling liquid in indirect heat exchange to the hot fluid stream passed through the second heat exchanger, a conduit for withdrawing hot secondary cooling liquid from the second heat exchanger and delivering it to the hot reservoir, a conduit communicating with the hot reservoir and a cooler for delivering hot secondary cooling liquid from the hot reservoir to the cooler to be cooled, a conduit communicating with the cooler and the cold reservoir for delivering cold secondary cooling liquid from the cooler to the cold reservoir, a cooling tower containing first and second heat exchanger sections, the first closed loop containing base refrigerant cooling fluid having the first and second sections of the cooling tower heat exchanger positioned therein in parallel arrangement, means to selectively circulate refrigerant base cooling fluid through only the cooling tower heat exchanger first section, when the ambient or atmospheric air flowing through the cooling tower is below a predetermined temperature, before the refrigerant base cooling fluid is circulated through the first heat exchanger, a secondary closed loop containing refrigerant base cooling fluid in controllable communication with the first closed loop, the cooling tower heat exchanger second section and the cooler, means to circulate refrigerant base cooling fluid in the secondary closed loop for cooling hot secondary cooling liquid in the cooler by indirect heat exchange with cold refrigerant base cooling fluid passed therethrough, when the ambient or atmospheric air flowing through the cooling tower is below a predetermined temperature, and means for terminating circulation of refrigerant base cooling fluid through the secondary closed loop, and means for the circulation of refrigerant base cooling fluid in the first closed loop simultaneously through the first and second sections of the cooling tower heat exchanger, when the ambient or atmospheric air temperature flowing through the cooling tower is above a predetermined temperature.

3. Apparatus comprising in combination:
I. A base cooling system using a refrigeration cycle,
II. A peak-shaving system using a secondary cooling liquid, and
III. A regeneration system for the peak-shaving system secondary cooling liquid, with said base cooling system I comprising:
A. a first heat exchanger located in the steam condensor of a steam powered turbine,
B. a cooling tower containing a heat exchanger divided into first and second sections in parallel arrangement,
C. a conduit from the outlet of the first heat exchanger to the inlets of the first and second sections of the cooling tower heat exchanger,
D. a conduit from the outlets of the first and second sections of the cooling tower heat exchanger to a liquid refrigerant receiver,
E. a conduit from the liquid refrigerant receiver to a liquid refrigerant pump,
F. a conduit from the liquid refrigerant pump to the inlet of the first heat exchanger,
G. a refrigerant in the said base cooling system, and
H. control means to selectively circulate refrigerant through the first section, and by-pass the second section, of the cooling tower heat exchanger, with said peak-shaving system II comprising:
A. a second heat exchanger located in the steam condenser of a steam powered turbine,
B. a conduit from the outlet of the second heat exchanger to a reservoir for holding hot secondary cooling liquid,
C. a conduit from a reservoir for holding cold secondary cooling liquid to a third liquid pump,
D. a conduit from the third liquid pump to the inlet of the second heat exchanger,
E. a secondary cooling liquid in the said peak-shaving system, and
F. control means for removing the peak-shaving system from operation when it is unneeded to condense steam in the condenser, with the regeneration system for the secondary cooling liquid comprising:
A. a conduit communicating with the outlet side of the cooling tower heat exchanger second section and a second liquid refrigerant receiver,
B. a conduit communicating with the second liquid receiver and a second liquid refrigerant pump,
C. a conduit from the second liquid refrigerant pump to the inlet of a refrigerant reboiler,
D. a conduit from the vapor outlet of the refrigerant reboiler communicating with the inlet side of the cooling tower heat exchanger second section,
E. a conduit from the hot reservoir for the secondary cooling liquid to a fourth liquid pump,
F. a conduit from the fourth liquid pump to the refrigerant reboiler for delivering hot secondary cooling liquid thereto to be cooled,
G. a conduit from the refrigerant reboiler to the cold reservoir for delivering cold secondary cooling liquid thereto, and
H. control means for removing the regeneration system from operation when cooling of hot secondary cooling liquid is untimely.

4. Apparatus according to claim 1 in which the refrigerant is ammonia and the secondary cooling liquid is water.

5. Apparatus according to claim 4 in which the hot fluid stream is steam.

6. Apparatus according to claim 2 in which the first heat exchanger and the second heat exchanger are located in the steam condenser of a steam powered turbine.

7. Apparatus according to claim 6 in which the secondary cooling liquid is water.

8. Apparatus according to claim 7 in which the refrigerant is ammonia.

9. A method of cooling a hot fluid stream which comprises:

contacting a hot fluid stream in indirect heat exchange with a base cooling fluid so long as the base cooling fluid accepts heat rejected from the hot fluid stream and adequately cools the same, cooling the hot base cooling fluid by passing it through parallel first and second sections of a cooling tower heat exchanger and then returning it to again accept heat rejected by the hot fluid stream, supplementing the cooling of the hot fluid stream when the base cooling fluid provides inadequate cooling thereof, after being passed through both of said first and second sections of the cooling tower heat exchanger, by contemporaneously also indirectly contacting the hot fluid stream with a secondary cooling liquid which is cold thereby heating the secondary cooling liquid, delivering the hot secondary cooling liquid to a hot reservoir for storage, isolating the flow and subsequent recirculation of base cooling fluid through the cooling tower heat exchanger first section from flow and subsequent recirculation of base cooling fluid through the cooling tower heat exchanger second section, when the hot fluid stream is sufficiently cooled by base cooling fluid itself cooled by passage through only the first section, using the stream of base cooling fluid cooled by passing it through the second section of the cooling tower to cool hot secondary cooling liquid removed from the hot reservoir, delivering the cold secondary cooling liquid to a cold reservoir for storage, and withdrawing cold secondary cooling liquid from the cold reservoir and again delivering it into indirect heat exchange with the hot fluid stream when the base cooling fluid provides inadequate cooling.

10. A method according to claim 9 in which the base cooling fluid is converted from a liquid to a vapor by heat rejected to it from the hot fluid stream, and the vapor is condensed to a liquid in passing through the cooling tower.

11. A method according to claim 9 in which the temperature of the air, the size of the cooling tower and the rate of air flow through the cooling tower provide a limit as to the cooling of the hot fluid stream which can be effected by the base cooling fluid on hot days so that when such cooling is inadequate, supplemental cooling by means of the secondary cooling liquid is activated.

12. A method according to claim 9 in which the base cooling fluid is a refrigerant.

13. A method according to claim 12 in which the refrigerant is ammonia.

14. A method according to claim 9 in which the secondary cooling liquid is water.

15. A method according to claim 9 in which the hot fluid stream is steam, the base cooling fluid is a refrigerant and the secondary cooling liquid is water.

16. A method according to claim 15 in which the refrigerant is ammonia.

17. A method according to claim 9 in which the hot secondary cooling liquid is cooled primarily during evening hours and the cold secondary cooling liquid is used during daylight hours to cool the hot fluid stream.

18. A method according to claim 17 in which the hot fluid stream is waste steam from a steam driven turbine.

19. A method according to claim 18 in which the steam driven turbine is used to generate electric power and the steam is condensed to water in a steam condenser.

* * * * *

UNITED STATES PATENT AND TRADEMARK OFFICE
CERTIFICATE OF CORRECTION

PATENT NO. : 4,315,404
DATED : February 16, 1982
INVENTOR(S) : RICHARD LEO SCHMITT ET AL It is certified that error appears in the above-identified patent and that said Letters Patent are hereby corrected as shown below:

Column 5, line 34, before "cold" insert --the--; Column 8, line 11, change "37" to --35--; Column 9, Table 3, column 10, change "33" to --X--.

Signed and Sealed this

Thirteenth Day of April 1982

[SEAL]

Attest:

Attesting Officer

GERALD J. MOSSINGHOFF
Commissioner of Patents and Trademarks